United States Patent [19]
Bailey et al.

[11] 3,958,166
[45] May 18, 1976

[54] SPEED ADJUSTING APPARATUS

[75] Inventors: Arthur Raymond Bailey, Bingley; John Peter Edgar, London, both of England

[73] Assignee: National Research Development Corporation, London, England

[22] Filed: Sept. 17, 1974

[21] Appl. No.: 506,779

Related U.S. Application Data

[63] Continuation of Ser. No. 341,601, March 15, 1973.

[30] Foreign Application Priority Data
Mar. 16, 1972 United Kingdom............ 12296/72

[52] U.S. Cl............................. 318/687; 318/135; 318/302; 318/372
[51] Int. Cl.²...................................... G05B 11/00
[58] Field of Search .......... 318/372, 374, 135, 561, 318/608, 302, 304, 687

[56] References Cited
UNITED STATES PATENTS

| | | |
|---|---|---|
| 3,277,357 | 10/1966 | Willis............................. 318/372 X |
| 3,439,198 | 4/1969 | Lee................................ 318/135 X |
| 3,513,370 | 5/1970 | Pullen............................... 318/608 |
| 3,699,555 | 10/1972 | Du Vall...................... 318/561 UX |
| 3,731,177 | 5/1973 | Commander et al........... 318/561 X |
| 3,735,231 | 5/1973 | Sawyer.......................... 318/135 X |
| 3,736,881 | 6/1973 | Lorinet......................... 318/135 X |
| 3,761,790 | 9/1973 | Daab............................ 318/372 X |
| 3,803,466 | 4/1974 | Starkey......................... 318/135 X |
| 3,839,664 | 10/1974 | Dirks et al..................... 318/135 X |
| B368,397 | 1/1975 | MacWade et al................ 318/561 |

*Primary Examiner*—Benjamin Dobeck
*Attorney, Agent, or Firm*—Cushman, Darby & Cushman

[57] ABSTRACT

Means for controlling the speed of the secondary of a linear motor, particularly the shuttle of a linear motor powered loom, consists of a series of uniformly spaced markings on the secondary and a sensor responsive to the markings and located adjacent to the linear motor primary. The markings cause the sensor to produce an oscillating output, the frequency of which is dependent on the speed of the secondary. A control signal derived from the sensor output is used to turn off the supply of current to the linear motor primary when the secondary is travelling at the required speed.

12 Claims, 8 Drawing Figures

SPEED ADJUSTING APPARATUS

This is a continuation of application Ser. No. 341,601 filed Mar. 15, 1973.

This invention relates to apparatus for adjusting the speed of an object to a predetermined value, of the kind in which the accelerating or retarding force is removed when this predetermined speed is reached. The invention has particular, but by no means exclusive application to the provision of a braking system for shuttles in looms. It can also be used to control the speed at which a loom shuttle emerges from the projecting mechanism.

According to the invention, apparatus for adjusting the speed of a linear motor secondary to a predetermined value, comprising marking on the secondary spaced apart at uniform intervals along the direction of travel, a sensor responsive to said markings as the secondary passes in proximity to a linear induction motor primary to produce a signal of frequency dependent on the speed of travel of the secondary, means responsive to said sensor for producing a control signal when said frequency reaches a value corresponding to said predetermined speed and means responsive to said control signal to disconnect the supply of electric current to the linear induction motor primary.

In one form of the invention, the markings on the object comprises alternate light and dark stripes and the sensor is a photo-detector. Preferably, either a plurality of photocells or one photocell with a light combining system is used so that information is received from more than one part of the markings at any one time, thus reducing the chance of dirt, for example, interfering with some of the required pulses.

In another form of the invention, the markings comprise magnetic inserts in the object and the sensor comprises a magnetic detecting system. If a magnetic system is used, it must be very carefully designed to prevent interference from the field generated by the linear induction motor primary.

The control means includes comparator means which may comprise a resonant circuit tuned to the frequency of the output from the sensor when the secondary is travelling at the required speed. Alternatively, it may comprise a monostable multivibrator having a relaxation time equal to the pulse length of pulses derived from the sensor when the secondary is travelling at the required speed.

The invention is particularly suitable for use as a braking system for the shuttle of a loom. Such a brake must be capable of dissipating a large amount of energy in a very short distance and the shuttle must come to rest in the same position after each operation despite the fact that, when a weft package is contained within the shuttle, the weight of the shuttle changes due to discharge of weft material. In one embodiment of the invention, the predetermined speed is greater than zero and the final stopping of the shuttle is effected by a mechanical brake. In another embodiment, the entire braking action is carried out in accordance with the invention, the predetermined speed being zero.

Where the projecting mechanism for the shuttle of a loom is of the type which gradually accelerates the shuttle over a relatively extended period, such as is the case when a linear motor is used for this purpose, apparatus in accordance with the invention can be used to control the speed at which the shuttle emerges. In this case, the predetermined speed is, of course, the desired speed of emergence of the shuttle.

In order that the invention may be more readily understood, embodiments thereof will now be described with reference to the accompanying drawings in which.

Figure 1:
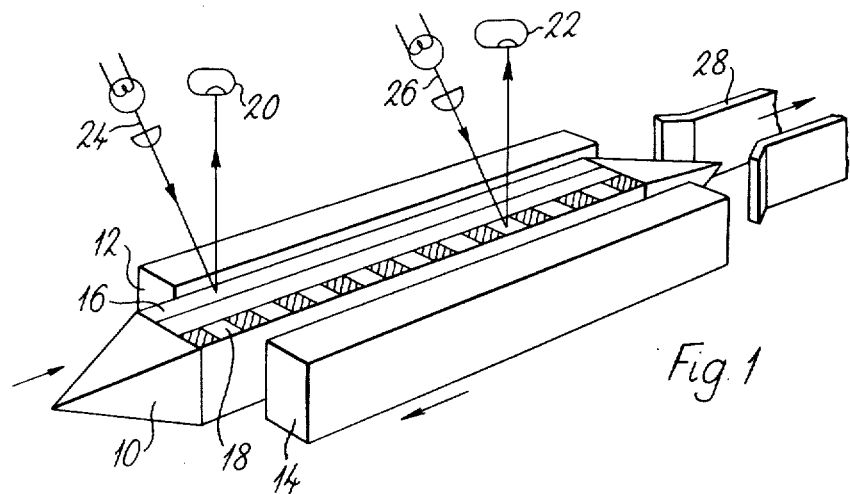
FIG. 1 is a perspective view of a braking system for the shuttle of a loom, in accordance with the invention, employing an optical sensor.

Referring to FIG. 1, a shuttle 10 is shown entering the space between two linear induction motor primaries 12 and 14. The shuttle itself forms secondaries for the two primaries. It should be noted in passing that the magnetic circuits formed by each primary 12, 14 and a part of the shuttle 10 may be substantially separate from one another. Alternatively the two primaries 12 and 14 may together form a double-sided linear induction motor with the shuttle action as a single secondary for both.

On its upper surface, the shuttle 10 carries two strips 16 and 18 which extend parallel to the direction of travel of the shuttle and each of which is confronted by a respective photocell 20 and 22. Respective light sources 24 and 26, each comprising a lamp and collimating lens, are arranged to illuminate the parts of the strips 16 and 18 confronted by the respective photocells 20 and 22.

The strip 16 is arranged to reflect light along its entire length. The corresponding photocell 20 is disposed near the end of the linear motor primaries 12 and 14 where the shuttle enters at high speed and is used to indicate the arrival of the shuttle.

The strip 18 comprises alternate reflective and non-reflective areas. The corresponding photocell 22 is disposed at an intermediate position along the length of the primaries 12 and 14, rather nearer the end from which the shuttle emerges. It is used to measure the speed of the shuttle and to turn off the supply of current to the primaries 12 and 14 when this speed reaches a predetermined, relatively low value. Beyond the linear motor primaries 12 and 14, a mechanical brake 28 is provided to finally stop the shuttle after its speed has been reduced by the linear motor primaries. In one embodiment of the invention, where the shuttle enters the space between the linear motor primaries at a speed of 50 feet per second, the supply of current to the linear motor primaries is turned off when the speed of the shuttle has been reduced to 5 feet per second. The kinetic energy of a shuttle travelling at 5 feet per second can readily be removed by means of a mechanical brake without any undue heating problems. Alternatively the linear motor primaries 12 and 14 can be used to reduce the speed of the shuttle 10 to such an extent that it is finally brought to rest by naturally occurring friction with the sley board, no separate mechanical brake being provided.

Figure 2:
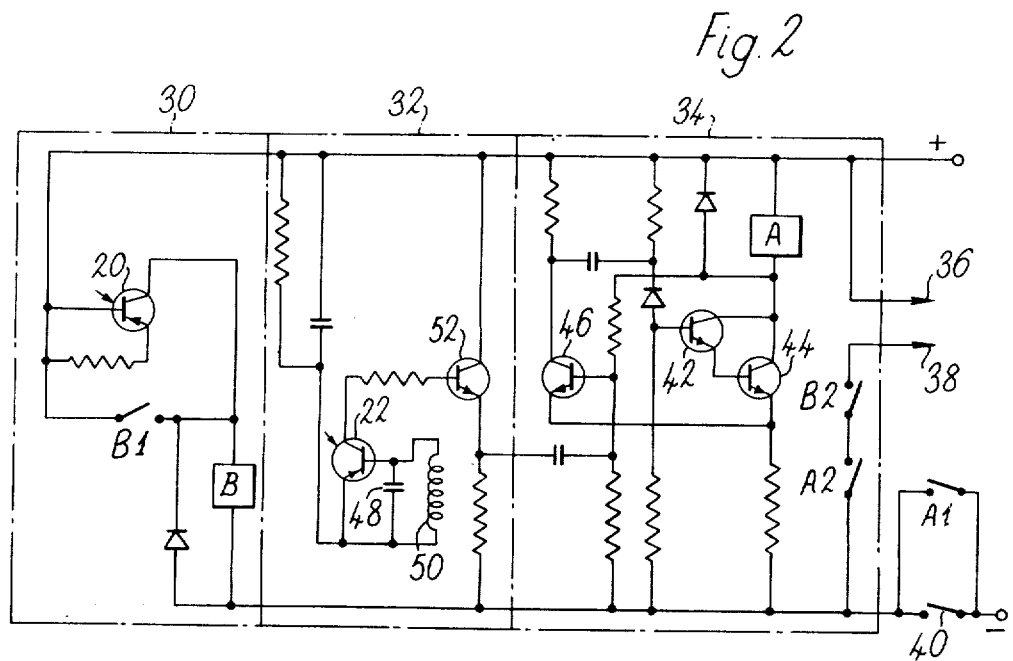
FIG. 2 is a diagram of the electrical control circuit of the embodiment illustrated in FIG. 1.

Referring to FIG. 2, the photocells 20 and 22 each comprise photo-transistors. The circuit of FIG. 2 is in three main sections, a shuttle arrival detector 30, which includes the photo-transistor 20, a speed measuring unit 32, which includes the photo-transistor 22 and a monostable multivibrator 34 which controls the operation of the inverter (not shown) which supplies current to the linear induction motor primaries 12 and 14 (FIG. 1), the inverter operating when a control signal is supplied to terminals 36 and 38. The function of the various components will be explained in the following description of the sequence of operations.

The switch 40 is attached to the loom mechanism and is arranged to be closed for a short period of time at the instant when a shuttle is despatched across the loom. This energizes the multivibrator 34 which takes up its stable state with transistors 42 and 44 conducting and the transistor 46 cut off so that relay A immediately operates, the contact A1 maintaining the supply of current from the negative terminal after switch 40 has opened and the contact A2 preparing to energize the terminal 38.

As soon as the shuttle 10 reaches the space between the primaries 12 and 14 (FIG. 1), photo-transistor 20 conducts, operating relay B. Contact B1 short circuits the photo-transistor 20 so that relay B remains operated regardless of any interference with the illumination of photo-transistor 20 and also after the trailing end of the strip 16 has passed photo-transistor 20. The contact B2 completes the circuit connecting contact A2 to terminal 38 so that the primaries 12 and 14 are energized.

The primaries 12 and 14 are energized in such a way that a magnetic field is produced in the shuttle 10 which travels in the opposite direction to the direction of movement of the shuttle 10. The speed of the shuttle 10 is thus reduced.

A parallel resonant circuit comprising capacitance 48 and inductance 50 is connected between the base and the emitter of the photo-transistor 22. This resonant circuit, which operates as a comparator is tuned to a frequency equal to that with which the light reflected by the strip 18 on to the photo-transistor 22 is modulated when the shuttle 10 is moving at the predetermined speed at which the current to the linear motor primaries 12 and 14 is to be turned off. When light incident on the photo-transistor 22 is modulated at this frequency, a brief train of pulses at this frequency is supplied via transistor 52, which is connected as an emitter follower, to the base of transistor 46, causing the multivibrator 34 to take up its unstable state. Transistors 42 and 44 are then cut off, so that relay A is de-energized and contacts A1 and A2 are opened. Since switch 40 is open at this time, the circuit is disconnected from the negative supply terminal and relay B also releases before the multivibrator 34 has time to revert to its stable state. The opening of contacts A1 and A2 also removes the connection between the negative supply terminal and the terminal 38 so that the linear motor primaries 12 and 14 are de-energized. The shuttle 10 then travels at its reduced speed into the mechanical brake 28 by which it is brought to rest.

If a critical reflective area on the strip 18 is dirty, insufficient light may be reflected to operate the phototransistor 22. This could result in the frequency modulating light incident on the photo-transistor 22 to drop to half its normal value at the time when it would otherwise be equal to the resonant frequency of the circuit formed by the capacitance 48 and inductance 50. It will be realised that this circuit will not respond to signals produced by the incident light modulated at a frequency lower than its resonant frequency and consequently, if the resonant frequency is not properly detected, the linear motor primaries 12 and 14 will remain energized while the speed of the shuttle is further reduced. This will result in the shuttle 10 being brought to rest and accelerated in the opposite direction. It would then be ejected back into the loom at a speed not exceeding the speed corresponding to the resonant frequency (the circuit 32 is, of course, not sensitive to direction of movement). In order to reduce the possibility of this happening, a preferred form of the invention makes use of light from more than one strip at the same time.

Figure 3:
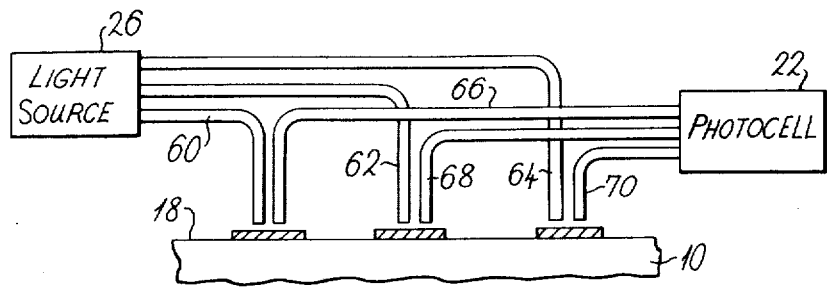
FIG. 3 is a schematic sectional view of a modified optical system for use with the embodiment of FIG. 1.

Referring to FIG. 3, the light source 26 is arranged to illuminate three adjacent regions of the strip 18 spaced apart by the pitch of the light and dark areas thereon. This is done by means of light guides 60, 62 and 64. Reflected light from these areas is then supplied to the photocell 22 by corresponding light guides 66, 68 and 70. The light guides 60 to 70 may take the form of lenses and mirrors or may be formed using fibre optics techniques. If it is arranged that reflected light from any one of the guides 66, 68 and 70 is enough to energize the photocell 22, three adjacent regions would have to be sufficiently dirty to prevent adequate reflection before the apparatus failed to operate.

It should be noted in passing that, although the reflecting regions of the strip 18 are shown in FIG. 3 as slightly raised, that is primarily for convenience of representation and the invention equally contemplates the use of a completely flat strip 18.

Figure 4:
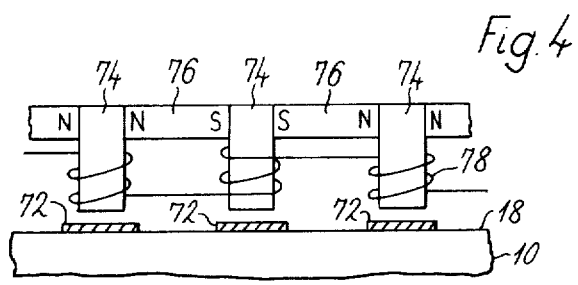
FIG. 4 is a fragmentary sectional view illustrating a magnetic sensor in accordance with the invention.

Instead of using optical methods to produce a signal of frequency proportional to the speed of the shuttle, magnetic methods may be used. Referring to FIG. 4, the strip 18 on the shuttle 10 comprises a series of inserts 72 of magnetic material, the rest of the shuttle in the immediate vicinity of the strip 18 being of non-magnetic material. The sensor takes the form of a series of poles 74 spaced apart by a distance equal to that between adjacent magnetic inserts 72 and having alternately oppositely poled permanent magnets 76 between adjacent pairs of poles 74. Each pole 74 carries a winding 78. The windings 78 are connected in series with alternate windings being connected with opposite senses of rotation. With this arrangement, when the shuttle is moving, a signal is induced in the various windings 78 of frequency dependent on the speed of the shuttle 10.

Figure 5:
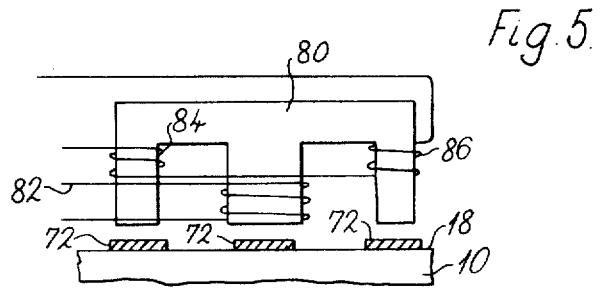
FIG. 5 is a sectional view illustrating another form of a magnetic sensor in accordance with the invention.

FIG. 5 illustrates an alternative arrangement using a pilot tone in place of permanent magnets. An E-shaped core 80, of pitch equal to that of the magnetic insert 72 carries a winding 82 to which a pilot tone is supplied on the centre pole of the core and oppositely wound windings 84 and 86 on the outer cores. The windings 84 and 86 are connected in series so that, in the absence of the shuttle, the effect of the pilot tone thereon is balanced. Once again, in the presence of the shuttle 10, the frequency of the signal detected by the windings 84 and 86 is proportional to the speed of the shuttle.

With both of the embodiments shown in FIGS. 4 and 5, there is no output when the shuttle is stationary.

As previously mentioned, apparatus in accordance with the invention can also be used to control the speed at which the shuttle of a loom is projected during picking. If linear motors are used to project the shuttle, the apparatus is generally as shown in FIG. 1 except that the photocell 20 and the mechanical brake 28 are omitted and the photocell 22 is disposed close to the end of the linear motors 12 and 14 from which the shuttle is to emerge. The circuit of FIG. 2 is modified by the omission of the shuttle arrival detector 30, the relay contacts B2 being replaced by a permanent connection. The shuttle is launched by momentarily closing the switch 40 whereupon relay A operates, causing current to be supplied to the linear motor primaries 12 and 14. When the shuttle reaches the required speed, this is detected by the photo-detector 22 and the resonant circuit comprising the capacitant 48 and inductance 50. The multivibrator 34 takes up its unstable state whereupon relay A is de-energized and the supply of current to the linear motor primaries 12 and 14 is turned off.

If apparatus in accordance with the invention is to be used both to control both picking and braking of the shuttle of a loom, the switch 40 of the brake may comprise the contacts of a relay which replaces the collector resistance of the transistor 46 in the multivibrator 34 of the circuit controlling projection of the shuttle. Thus the multivibrator 34 of the brake is energised at the time when the supply of current to the projection linear motor primaries is turned off.

It is particularly advantageous to have means for accurately controlling the speed of projection of a shuttle where the shuttle contains a weft package since, as weft material is discharged, the weight of the shuttle decreases, thus decreasing the energy required to accelerate it to a specified speed.

As an alternative to using a resonant circuit as a comparator to determine when the frequency detected by the photo-transistor 22 has the required value, the output of the photo-transistor 22 may be fed directly to a monostable multivibrator to trip it into its unstable state. The relaxation time of the multivibrator is made equal to the pulse length of pulses derived from the photo-transistor 22 when the light incident thereon has the required frequency. Thus, the multivibrator is unable to return to its stable state when the frequency of the output from the photo-transistor 22 is higher than the required value but changes state once during each period when this frequency is below the required value. When the apparatus in accordance with the invention is being used to control a brake, the brake is arranged to remain on during the time when the multivibrator is in its unstable state. On the other hand, when the apparatus is being used to control picking, the supply of current to the motors is arranged to be turned off if the multivibrator remains in its unstable state for longer than the period of oscillation of the output from the photo-transistor 22. This arrangement has the advantage over that employing a resonant circuit that the supply of current to the linear motor is turned off when the shuttle is travelling at any speed above the required value (for picking) or below the required value (for braking) and not merely precisely at the required value.

A circuit employing monostables which can be used to control the supply of current to the unit of the type shown in FIG. 1, one on each side of the loom, will now be described with reference to FIG. 6. Each unit is used for both picking and braking. The photocell 20 is not used to turn on the motors, signals for this purpose being derived from the loom timer. Instead, the photocell 20 is aligned with the strip 18 and connected in parallel with the photocell 22, thereby extending the range over which the strip 18 is confronted by a photocell. The strip 16 is not used and can be omitted.

The output from the photocell 22 is connected to terminal 90 whence it is applied to the inputs of a pair of differentiators 92 and 94. The differentiator 92 is arranged to produce an output pulse coincident with the beginning of each pulse from the photocells 20 and 22, that is, coincident with each non-reflective to reflective transition on the strip 1. The differentiator 94 is arranged to produce an output pulse coincident with the trailing edge of each pulse from the photocells 20 and 22, that is, coincident with each reflective to non-reflective transition on the strip 18. The rest of the control circuit is divided into two parts, one of which is concerned with the control of picking and the other with the control of braking. The part concerned with the control of picking will now be described.

The output from the leading edge differentiator 92 is connected via a monostable 96 to one input of an AND gate 98. The output of the trailing edge differentiator 94 is connected directly to the other input of the AND gate 98. The output of the AND gate 98 is connected to the reset input of the bistable 100. The set input of the bistable 100 is connected to a terminal 102 which is connected to receive a 'pick' signal from the loom timer. The set output of the bistable 100 is connected to one input of an AND gate 104. The other input of the AND gate 104 is connected to a terminal 106 which is connected to receive a 'pick enable' signal from the loom timer. The output of the AND gate 104 is connected to an inverter 107 which supplies power to the linear motor primaries (not shown).

In use, receipt of a 'pick' signal from the loom timer at the terminal 102 sets the bistable 100. Provided that a 'pick enable' signal is present at the terminal 106, an output is received from the AND gate 104, thereby turning on the inverter. As the shuttle 10 moves under the photocell 22, a train of square pulses is received at the terminal 90. The leading edge of pulse causes the monostable 96 to be set. At slow shuttle speeds, the monostable 96 will have reached the end of its period and have become reset before the trailing edge of the corresponding pulse is received. Thus, the AND gates do not receive two inputs simultaneously and the bistable 100 remains in its set condition. The period of the monostable 96 is chosen to be such that, when the shuttle reaches the required speed, the monostable 96 is still in its set condition when the trailing edge of the pulse which set it causes the differentiator 94 to apply an input to the AND gate 98. Since the monostable 96 is still set, the AND gate 98 is still receiving a signal at its other input and consequently the bistable 100 is reset, turning off the inverter.

The purpose of the 'pick enable' signal is to provide an overriding 'off' signal to minimise the possibility of a spurious pick. In addition, if the shuttle has not reached the required speed before the strip 18 is clear of the photocell 20 the inverter 107 is turned off when the loom timer terminates the 'pick enable' signal.

The part of the circuit concerned with the control of braking will now be described. A 'brake enable' signal, derived from the loom timer, is applied to a terminal 108 which is connected to the input of a differentiator 110 which produces an output pulse coincident with the beginning of the 'brake enable' signal. The output of the differentiator 110 is connected to the set input of a bistable 112. The reset input of the bistable 112 is connected to the output of the leading edge differentiator 92 and the reset output thereof is connected to the input of a differentiator 114, the output of which is connected to the set input of a bistable 116. The set output of the bistable 116 is connected to one input of an AND gate 118. The other input of the AND gate 118 is connected to the terminal 108 and the output thereof is connected to the inverter 107. The units so far described serve the purpose of turning the brake on and operate as follows.

The loom timer is arranged to provide the 'brake enable' signal when the shuttle leaves the linear motor primaries 12 and 14 at the other side of the loom. When this happens, the bistable 112 is set and the AND gate 118 enabled. When the shuttle reaches the linear motors controlled by the circuit being described, the first reflective area on the strip 18 causes the leading edge differentiator 92 to apply a signal to the reset input of the bistable 112 so that the differentiator 114 produces a pulse at its output, setting the bistable 116 in order to turn the inverter on via the AND gate 118. Thus, the inverter can be turned on via the AND gate 118 only when a signal from the leading edge differentiator 92 follows application of the 'brake enable' signal. This prevents the brake control circuit from interfering with the operation of the inverter during the time when the corresponding motors are being used for picking.

The circuit for turning off the brake consists of a resetable monostable 120 having its set input connected to the output of the leading edge differentiator 92 and its reset input connected via a delay device 122 to the output of the trailing edge differentiator 94. The reset output of the monostable 120 is connected to one input of an AND gate 124 the other input of which is connected to the output of the trailing edge detector 94. The output of the AND gate 124 is connected to the reset input of the bistable 116.

In operation, after the arrival of the shuttle has caused the bistable 116 to be set as previously described, successive pulses are received from the photocells 20 and 22 due to the reflective and non-reflective areas of the strip 18. The leading edge of each pulse causes the monostable 120 to be set. If the shuttle is moving so fast that the output from the trailing edge differentiator 94 is received by the AND gate 124 before the monostable has reached the end of its period and reverted to its reset state, no output is produced from the AND gate 124. Consequently the bistable 116 remains in its set state and the brake continues in operation. The period of the monostable 120 is chosen to be such that when the speed of the shuttle has been reduced to the value at which the brake is to be turned off the monostable 120 reverts to its reset state at the time when the trailing edge differentiator 94 produces its output pulse. Consequently, signals are received at both inputs of the AND gate 124 and the bistable 116 is reset, causing the inverter 107 to be turned off.

It is possible that, when the shuttle is travelling at a speed very much faster than that at which the brake is to be turned off, several trailing edge pulses may be received from the differentiator 94 during the period of the monostable 120. It is possible that one of these may occur after the monostable 120 has reverted to its reset state and before the arrival of the next leading edge pulse from the differentiator 92. This could cause the brake to be turned off erroneously. Such erroneous operation is prevented by the delay device 122. Each trailing edge pulse from the differentiator 94 causes the monostable 120 to be reset after the period of the delay device 122. The length of the period of the delay device 122 is greater than the pulse length of the output pulses from the trailing edge differentiator 94, thereby ensuring that a single trailing edge pulse cannot activate both inputs of the AND gate 124. However, the period of the delay device 122 is less than the time period between a trailing edge pulse from a differentiator 94 and the next leading edge pulse from a differentiator 92 when the shuttle is travelling at its maximum speed, thereby ensuring that the monostable 120 cannot be reset by a trailing edge pulse via the delay device 122 after it has been set by a subsequent leading edge pulse from the differentiator 92. Thus the operation of delay device 122 in resetting the monostable 120 ensures that the AND gate 124 can be caused to produce an output only by a trailing edge pulse from the differentiator 94 which occurs when the monostable 120 has reverted to its reset state at the end of its period, having been initially set by the leading edge pulse from the differentiator 92 due to the same reflective portion on the strip 18.

It will be appreciated that, although the outputs from the differentiator 92 and 94 are permanently connected to the monostables 96 and 120, the monostable 96 has no effect during braking and the monostable 120 has no effect during picking because the corresponding bistables 100 and 116, which control operation of the inverter, are already reset at such times.

Separate outputs from the control circuit to the inverter are provided dependent on whether the operation to be performed is picking or braking. It is, of course, true that the direction of the travelling field produced by the linear motors is the same both for picking and for braking, that is to say, inwards. However, it will usually be found that the linear motors can bring a shuttle to rest from a predetermined speed in a shorter distance than it can accelerate it from rest to that speed, for the same conditions of the electricity supply. Consequently, in order to ensure that the shuttle travels a sufficient distance into the linear motors when being braked to enable it to be accelerated to the required speed during the next picking operation, it is necessary to vary some parameter of the electricity supply, for example to reduce the voltage. Thus, it is necessary to vary the operation of the inverter dependent on whether it is supplying power for picking or for braking. One way of doing this is to use the separate outputs from the AND gates 104 and 118. Another way is to derive a signal from this purpose from the loom timer in which case the outputs from the AND gates 104 and 118 can be connected to one another.

So far, it has been assumed that a single inverter is used to supply the linear motors at both sides of the loom, the inverter outputs being connected to the appropriate motors by switching means (not shown) operated by the loom timer. For example, the 'brake enable' signal may be used to effect the necessary changeover operation. With this arrangement, the signals from the photocells 20 and 22 on both sides of the loom are supplied to the terminal 90. In some circumstances, it may be preferred to provide a separate inverter power supply unit and control circuits for each side of the loom. This enables certain simplifications to be made in the control system. A control circuit which takes advantage of these possibilities of simplification will now be described with reference to FIG. 7.

Figure 6:
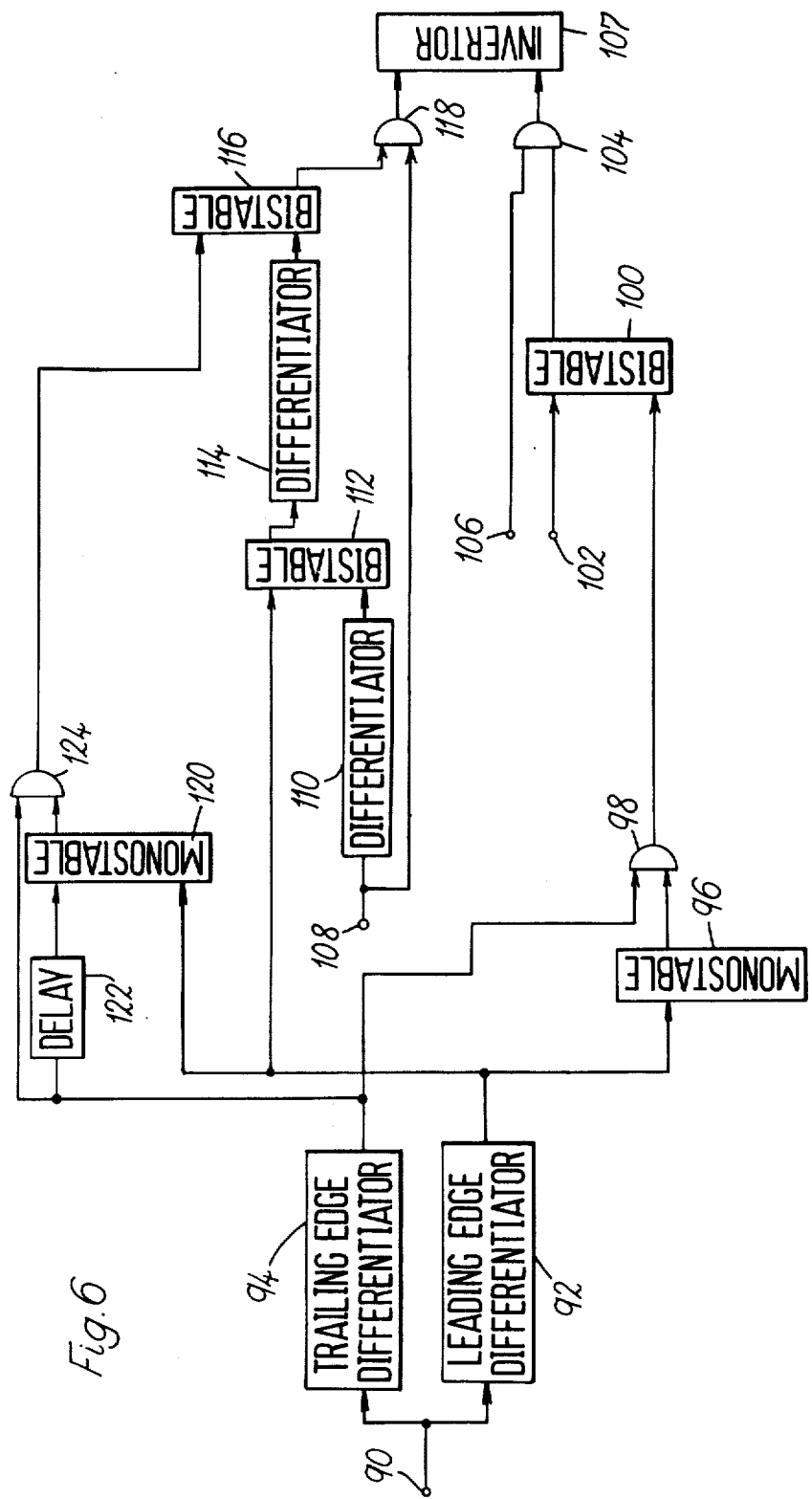
FIG. 6 is a block diagram of a control circuit in accordance with one embodiment of the invention.
Figure 7:
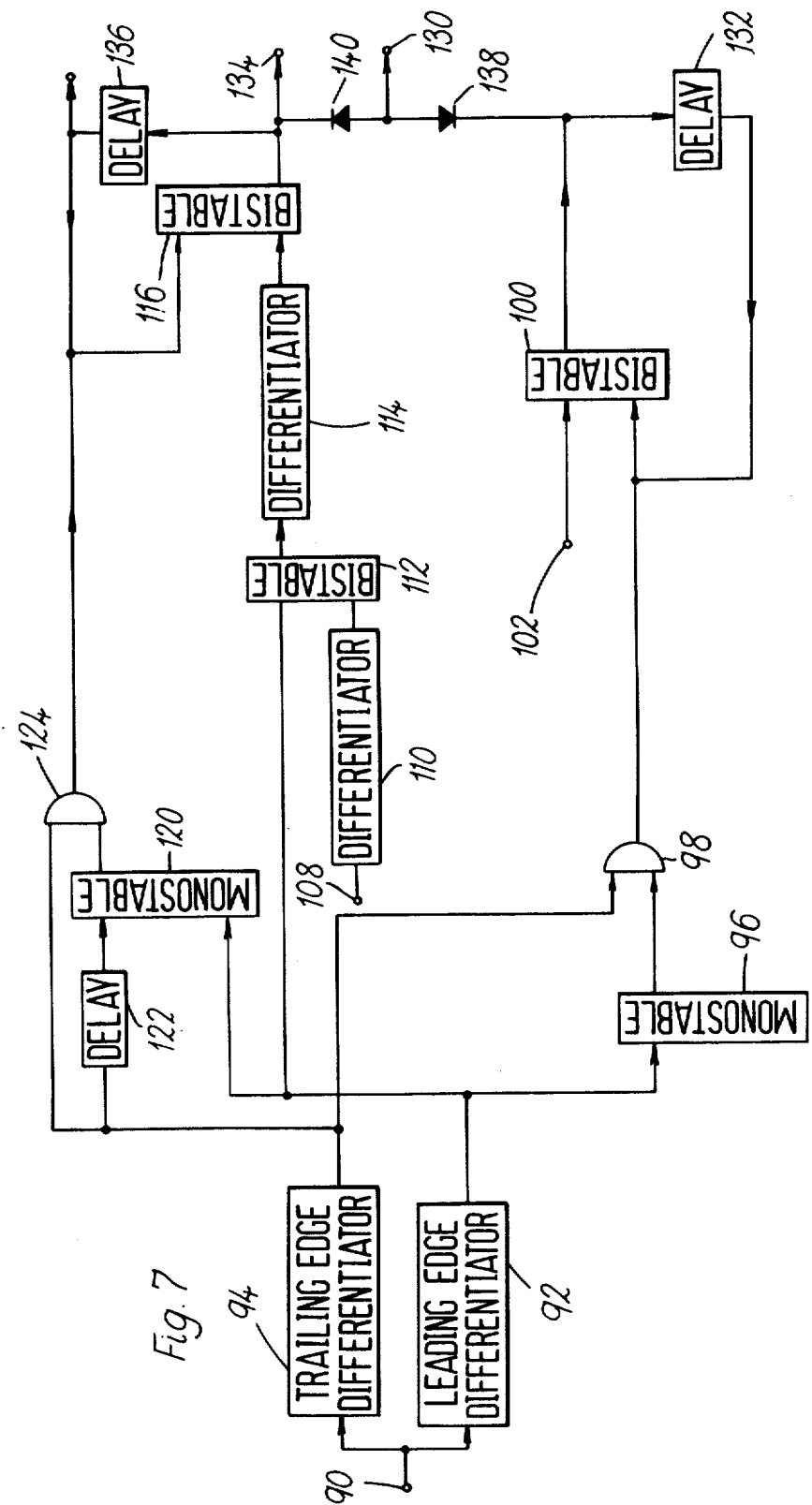
FIG. 7 is a block diagram of a control circuit in accordance with another embodiment of the invention.

A large part of the circuit illustrated in FIG. 7 is identical with that illustrated in FIG. 6. Identical reference numbers have been used for the various components of the circuit and these parts of the circuit and their manner of operation will not be described again in detail.

Control of picking is identical with that described with reference to FIG. 6 up to the bistable 100. However, the set output of the bistable 100 is connected directly to an output terminal 130 which is connected to the inverter, provision for the 'pick enable' signal being omitted. In addition, the set output bistable 100 is connected via a delay device 132 to the reset input of the bistable 100. The delay device 130 serves to turn off the inverter in the event that the shuttle does not reach the required speed before it leaves the motors, its period being arranged to be such that the shuttle has ample time to clear the linear motors even under the worst possible conditions.

Control of braking is identical with that described with reference to FIG. 6 as far as the bistable 116. However, the set output of the bistable 116 is connected directly to the output terminal 130, and also to a second output terminal 124 which is used to provide a signal to distinguish between picking and braking operations. The output from the bistable 116 is no longer gated by the 'brake enable' signal on terminal 108.

In order to prevent 'turn-off' failure which could cause the shuttle to be fired back into the shed, the set output of the bistable 116 is also connected via a delay device 136 to the reset input of the bistable 116. The period of the delay device 136 is sufficient to allow normal braking to take place even when the shuttle is carrying a full bobbin of weft.

A pair of diodes 138 and 140 are provided to prevent the output from the bistable 116 from affecting the delay device 132 and the output from the bistable 100 from affecting the output terminal 134 and the delay device 136 while allowing the outputs from both bistables to produce signals on the output terminal 130.

Figure 8:
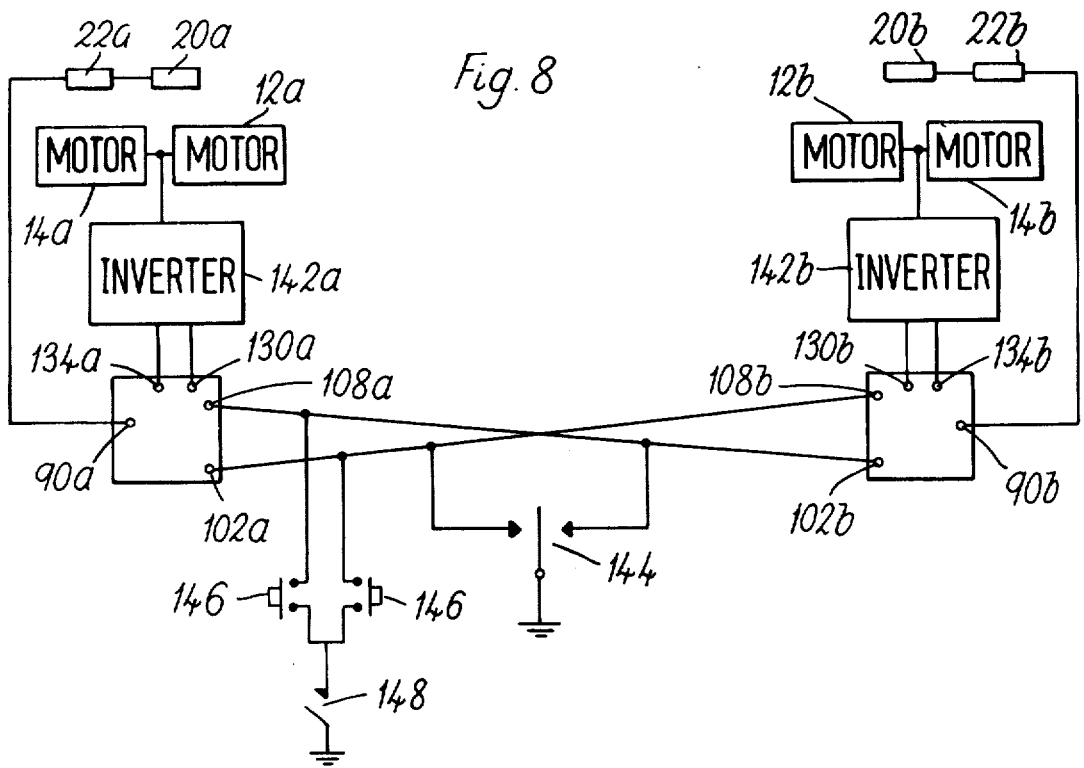
FIG. 8 is a block diagram showing how the control circuit of FIG. 7 is connected to the loom.

FIG. 8 illustrates how control units shown in FIG. 7 on the two sides of the loom are connected to one another and to their respective inverters 142a and 142b. The same reference numerals are used as are being used previously, components on the left hand side of the loom having a suffix a and components on the right hand side of the loom having the suffix b. It will be seen that the 'pick' input terminal 102a for the left hand side is connected to the 'brake enable' terminal 108b of the right hand side and vice versa. A three position switch 144, driven by the loom timer, is used to control picking. With the switch in the left hand position, picking from the a end takes place and with the switch in the right hand position picking from the b end takes place. The switch 144 occupies its centre position during shed changeover and when the loom is not in operation.

In addition, manually operable switches 146a and 146b are provided to initiate single picking from the a end and b end respectively. These switches are connected in the series with a shed interlock switch 148 which is closed only when the shed is open so as to inhibit single picking during shed changeover.

It has been found that, in some circumstances, the detected time period between a non-reflective to reflective transition and the next reflective to non-reflective transition can be affected by light source intensity, ambient lighting and the distance of the photocells from the strip 18. If this problem arises, it is preferable to connect the photocells to the terminal 90 via a divide-by-two circuit so that the frequency of the signal at the terminal 90 depends on the repetition rate of the reflective areas of the strip 18 rather than on their width. It is of course necessary to alter either the pitch of the reflective areas on the strip 18 or the periods of the monostables 96 and 120 if the apparatus is to operate at the same speed as before.

We claim:

1. A linear electric motor comprising:
   a linear motor primary member arranged to be energised by a current supply;
   a linear motor secondary member designed for acceleratory and deceleratory movement along an axis of said primary member when said primary member is energized;
   switching means operative to disconnect the supply of current to said primary member and to maintain the supply disconnected, when the secondary member has been subject to acceleration at least until said secondary member reaches a position outside the influence of the accelerating field of the primary member and, when the secondary member has been subject to deceleration, at least until that member comes to rest; and
   control means whereby said switching means is operated when the speed of said secondary member reaches a predetermined value, wherein said control means comprises:
      sensing means responsive of movement of said secondary member to produce a signal the frequency of which is dependent upon the speed of said movement, and
      comparator means responsive to said frequency signal from said sensing means to produce a switching signal effective to operate said switching means when the frequency of said frequency signal reaches a value corresponding to said predetermined value of speed.

2. A linear electric motor according to claim 1, wherein:
   on at least a part of the surface of said linear motor secondary member, distinguishing elements are spaced apart at uniform intervals along the direction of travel, said sensing means being responsive to movement of said distinguishing elements.

3. A linear electric motor according to claim 2, wherein:
   said distinguishing elements comprise inserts of magnetic material and said sensing means comprises a magnetic detecting system responsive to movement of said inserts.

4. A linear electric motor according to claim 2, wherein:
   said distinguishing elements comprise alternate light and dark stripes and said sensing means is a photodetector responsive to movement of said stripes.

5. A linear electric motor according to claim 1, wherein:
   said comparator means includes a tuned circuit responsive to said frequency signal, to resonate at that frequency of said frequency signal which corresponds to said predetermined speed, so as to provide said switching signal.

6. A linear electric motor according to claim 4, wherein:
said photodetector comprises a phototransistor and said comparator means includes a resonant tuned circuit consisting of a capacitor and an inductor connected between the base and the emitter of said phototransistor.

7. A linear electric motor according to claim 1, wherein:
said comparator means comprises a monostable multivibrator having a relaxation time equal to that period of the signal from said sensing means which corresponds to said predetermined speed of said secondary member and means responsive to said multivibrator for indicating whether the period of said signals is greater or less than said relaxation time.

8. A linear electric motor according to claim 7 adapted to reduce the speed of said secondary member to said predetermined speed wherein:
said means responsive to said multivibrator is adapted to provide said switching signal when said multivibrator reverts to its stable state.

9. A linear electric motor according to claim 7, adapted to increase the speed of said secondary member to said predetermined speed, wherein:
said means responsive to said multivibrator is adapted to provide said switching signal when said multivibrator remains in its unstable state for longer than the period of the signal from said sensing means.

10. A linear electric motor according to claim 1, wherein the secondary member comprises the shuttle of a loom.

11. A loom in combination with a linear electric motor as claimed in claim 1 wherein said loom has a shuttle which comprises the secondary member of said electric motor.

12. A linear electric motor comprising:
a pair of linear motor primary members spaced apart on a common axis, and arranged to be energised by a current supply;
a linear motor secondary member designed for repetitive traverse of the common axis to and fro from one primary member to the other;
means for energising each primary member to produce acceleration on confronting the secondary member at the start of a traverse and means for energising each primary member to produce deceleration on confronting the secondary member at the end of a traverse;
switching means operative to disconnect the supply of current to each of the primary members independently of the other; and
control means whereby said switching means is operated, in respect of the primary member then confronting the secondary member, when the speed of the secondary member reaches a predetermined value, wherein said control means comprises:
sensing means responsive to movement of said secondary member to produce a signal the frequency of which is dependent upon the speed of said movement, and
comparator means responsive to said frequency signal from said sensing means to produce a switching signal effective to operate said switching means when the frequency of said frequency signal reaches a value corresponding to said predetermined value of speed.

* * * * *